Patented Aug. 6, 1940

2,210,819

UNITED STATES PATENT OFFICE 2,210,819

COFFEE AND METHOD OF PRESERVING SAME

Charles Reynolds, Kansas City, Mo.

No Drawing. Application May 3, 1939, Serial No. 271,603

9 Claims. (Cl. 99—167)

This invention relates to the treatment of coffee, cocoa and similar food products used for beverage purposes. Since it is primarily intended for the treatment of coffee, it will be described in that connection.

Coffee, when transported or stored, is ordinarily more or less exposed to the atmosphere, which may be either unduly dry or so humid as to dampen the berries. Among the most noted deleterious effects of the atmosphere upon a product such as coffee are change in color and considerable loss of flavor and aroma, resulting in a material reduction in the marketability of the product and the quality of the beverage brewed from it.

Many methods have heretofore been proposed for the treatment of coffee, in roasted or unroasted condition, to protect it from the atmosphere, and thus prevent shrinkage from drying, sweating from absorption of moisture, escape of aroma and destruction or undesirable alteration of color and flavor.

Various substances have been employed or suggested for coating green or roasted coffee. Among these might be mentioned starch, gum arabic, sugar, isinglass and eggs. Because of their hygroscopic properties, disagreeable effect upon the flavor or consistency of the beverage, or other disadvantages, these substances have not been satisfactory.

Briefly, my invention consists of a method of treating coffee or similar beverage product, for example, cocoa, to protect, preserve and improve its condition and quality, and, as an article of manufacture, the product treated in such manner as to be protected against deterioration and to possess medicinal properties.

One of the principal objects of my invention is to treat coffee or cocoa in such a manner as to preserve the flavor, seal in the aroma, and maintain a rich and pleasing color.

Another object is to improve green coffee by protecting it against the atmosphere, to preserve its flavor and aroma.

Another object is to protect roasted coffee whether ground or unground and whether can-packed, loose-packed or paper-bag-packed) against deterioration which might otherwise be occasioned by transportation or storage.

A further object is the treatment of coffee (ground or unground) in such a manner as to provide otherwise absent beneficial medicinal and healthful qualities without disagreeably affecting its taste or aroma.

These objects I realize by combining and incorporating with coffee (either the green berries or the roasted ground or unground coffee) a suitable quantity of iodine, which may be in the form of an iodide, for example, an iodide of the class which includes potassium iodide and sodium iodide, potassium iodide being preferable. By thus treating the berries (whole or ground) their pores are sealed and made impervious to the atmosphere. By adding the iodide in healthful and harmless proportions the beverage produced from the coffee so treated is given a darker and richer appearance and contains a beneficial, though small, quantity of iodine.

Iodine is recognized by medical authorities as possessing definite beneficial properties, when applied externally or taken internally in small quantities. The desirable iodine addition to coffee can be effected so as to protect it against deterioration, provide the medicinal element of the iodine, improve the color of the brewed coffee and materially enhance the commercial value of the product as an article of manufacture and sale.

In treating pure coffee, either the whole bean or the ground coffee, the proportional amount of iodide (e. g., potassium iodide) which will produce the desired protective results and at the same time have no deleterious effect but, on the contrary will afford healthful benefits to the ordinary users of coffee and especially to those needing iodine, is approximately five-one thousandths of one per cent (0.005%). The maximum quantity suitable and generally usable without undesirable effect upon the color and flavor of the brewed coffee is about 0.1%. These percentages apply to pure coffee, and may vary somewhat in the treatment of coffee adulterated by the mixture of chicory or other substitutes or substances.

The iodide may be incorporated in or applied to the coffee in different ways, for example, by spraying, by vapor process (e. g., passing the coffee through a zone of vapor, or exposing the coffee to the vapor in a closed chamber), or by mixing in dry condition and fusing by subsequent roasting or heating. The spraying, vapor or fusing treatments may be applied to the whole roasted bean and the ground roasted coffee. If the coffee is coated with the iodide after being roasted, it is generally advisable to reheat it promptly in order to dry it thoroughly before packing.

The iodide may be sprayed on (or applied in vapor form to) green or raw coffee, but its usefulness in this connection is mainly in its application to the green coffee after the outside film of the bean has been removed, which occurs during the roasting process. Subsequent roasting of the treated coffee does not decompose the treating substance, but, on the contrary, fuses it into intimate association with the coffee beans.

The dry mixing and fusing method of applying the coating of iodide to coffee, although usually not so satisfactory as the other methods, may best be effected by mixing finely pulverized crystaline potassium or sodium iodide in any suitable manner with either ground or unground roasted coffee and subjecting the mixture to heat.

Since potassium iodide melts or fuses at a low red heat and volatilizes (without decomposition) at a bright red heat its exposure to coffee-roasting temperature results in the production of a film of fused or semi-fused potassium iodide on the roasted coffee.

The coffee, after having been coated with the iodide, may be placed in its usual (or any suitable) container for sale to the consumer: the mixture of coffee and iodide, especially when effected by spray or vapor methods, remains homogenous under most severe shaking during transportation.

As thus described, my method is adapted for treatment of the whole coffee bean before, during or after roasting, or for treatment of the ground coffee before or after roasting or parching. The treatment is preferably effected by spraying the potassium iodide in aqueous solution on the coffee or by passing the coffee through the vapor obtained by heating potassium iodide. Whether performed prior to, during or after the roasting or parching of the coffee, the addition of the potassium iodide by spraying or vapor coating forms a protective film or coating on the coffee. Such treatment, either of the green or parched whole bean or of the ground bean, renders such coffee highly resistant to fermentation and loss of color and effectively seals the aroma within the bean or within the particles of ground coffee. By the treating process the aroma is preserved and maintained and the beverage derived from the treated coffee not only has a more attractive color and better taste, but also possesses desirable medicinal properties.

The addition of the iodide to the coffee by the dry mixing method, either before or after grinding, provides certain of the benefits of the spraying method, especially the important one of the presence of the medicinal iodine in the coffee. When the granular or pulverized potassium iodide is mixed with the coffee prior to the roasting process, the latter fuses the potassium iodide on the coffee particles and, to a considerable extent at least, effects a coating of the coffee by which the aroma is sealed in, in a manner similar to the sealing that takes place when the potassium iodide is applied as a spray or vapor.

Any suitable and convenient methods of and apparatus for adding the iodide to the coffee by spraying, dry-mixing and fusing or vapor-coating may be employed, these specific methods of and means for applying one material to another in dry, liquid or vapor form being old and well known and forming no part of my invention. Various forms of spray nozzles or vaporizers used in coating processes are available and well suited to my coating.

I claim:

1. The method of protecting and preserving edible beans adapted to be roasted in the making therefrom of a beverage product for human consumption which consists in mixing the beans with a relatively small quantity of iodine and heating the mixture to produce a dry coating of iodine upon the beans.

2. The method of preserving coffee preparatory to making a beverage therefrom which consists in coating the coffee with a compound selected from a group consisting of potassium iodide and sodium iodide.

3. The method of preserving coffee which consists in intimately mixing with the coffee an aqueous solution of potassium iodide to coat the coffee therewith, the proportion of potassium iodide to the coffee being from approximately 0.005 to 0.1 per cent by weight.

4. The method of protecting and preserving coffee which consists in roasting raw coffee and intimately mixing with the coffee from 0.005 to 0.100 per cent by weight of potassium iodide, and subsequently heating the mixture to fuse the potassium iodide upon the coffee.

5. The method of treating coffee which consists in roasting raw coffee, applying thereto a coating of potassium iodide, and heating the coated coffee.

6. As an article of manufacture, coffee particles having thereon a compound selected from a group consisting of potassium iodide and sodium iodide.

7. As an article of manufacture, coffee beans coated with an aqueous solution of a compound selected from a group consisting of potassium iodide and sodium iodide fused thereon.

8. An article of manufacture composed of coffee particles having a coating of potassium iodide thereon.

9. An article of manufacture composed of coffee particles coated with potassium iodide, the proportionate quantity of potassium iodide being approximately 0.005 to 0.100 per cent by weight.

CHARLES REYNOLDS.

CERTIFICATE OF CORRECTION.

Patent No. 2,210,819.  August 6, 1940.

CHARLES REYNOLDS.

It is hereby certified that error appears in the printed specification of the above numbered patent requiring correction as follows: Page 1, first column, line 46, before "whether" insert a left-hand parenthesis mark; page 2, second column, line 37, claim 4, for the word "beating" read --heating--; and that the said Letters Patent should be read with this correction therein that the same may conform to the record of the case in the Patent Office.

Signed and sealed this 29th day of October, A. D. 1940.

(Seal)

Henry Van Arsdale,
Acting Commissioner of Patents.